United States Patent [19]
Bell

[11] 3,944,398
[45] Mar. 16, 1976

[54] METHOD OF FORMING AN ABRASIVE COMPACT OF CUBIC BORON NITRIDE

[76] Inventor: Frank Rutherford Bell, Flat 41, Crown Court, 32 Minors St., Yeoville, Transvaal, South Africa

[22] Filed: Aug. 13, 1974

[21] Appl. No.: 496,957

Related U.S. Application Data

[63] Continuation-in-part of Ser. No. 465,683, April 30, 1974, abandoned.

[52] U.S. Cl.................................. 51/307; 51/309 R
[51] Int. Cl.² ........................................... B24D 3/04
[58] Field of Search ............ 51/293, 295, 307, 308, 51/309

[56] References Cited
UNITED STATES PATENTS

| | | | |
|---|---|---|---|
| 2,947,124 | 8/1960 | Madigan ................................ | 51/307 |
| 2,978,850 | 4/1961 | Gleszer ................................. | 51/307 |
| 3,233,988 | 2/1966 | Wentorf et al........................ | 51/307 |
| 3,684,466 | 8/1972 | Petrone................................. | 51/298 |
| 3,852,049 | 12/1974 | Hibbs et al............................ | 51/309 |

*Primary Examiner*—Donald J. Arnold
*Attorney, Agent, or Firm*—Young & Thompson

[57] ABSTRACT

An abrasive compact comprising diamond or cubic boron nitride or mixtures thereof held in a matrix of a refractory substance and a substance which dissolves the abrasive particle to at least a limited extent. The compact may be made by subjecting a powdered mixture of the ingredients to conditions of temperature and pressure at which the abrasive particle is crystallographically stable and the solvent substance acts to dissolve the abrasive particle. The refractory substance and solvent substance are preferably so chosen that during compact manufacture there is interaction resulting in the formation of a hard material.

11 Claims, 1 Drawing Figure

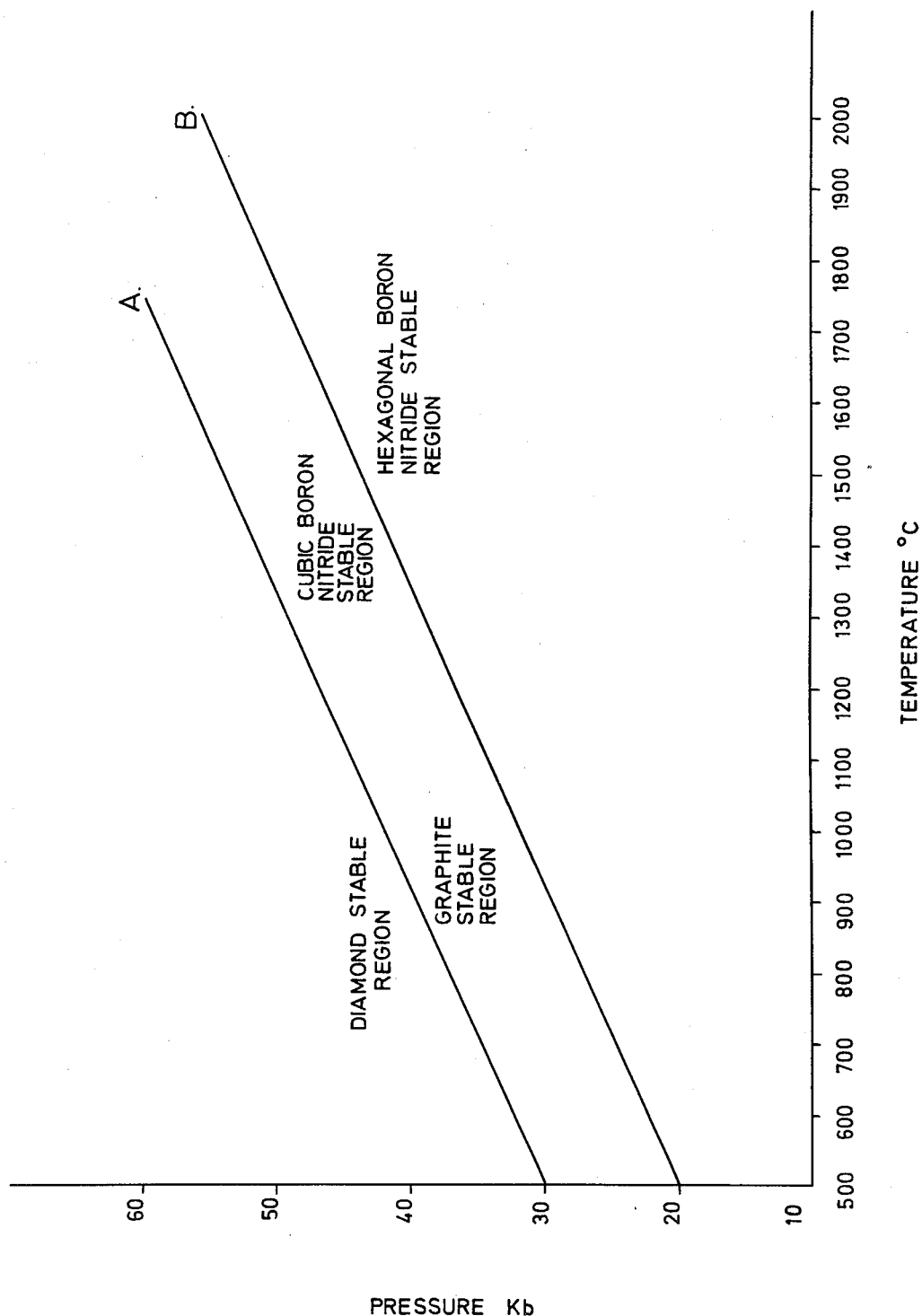

METHOD OF FORMING AN ABRASIVE COMPACT OF CUBIC BORON NITRIDE

CROSS REFERENCE TO RELATED APPLICATION

This application is a continuation-in-part of my co-pending application Ser. No. 465,683 filed Apr. 30, 1974, and now abandoned.

This invention relates to abrasive compacts.

Abrasive compacts consist essentially of abrasive particles, generally in finely powdered form, bonded into a conglomerate or compact by means of a suitable bonding matrix. In the past the bonding matrix has generally been a metal such as cobalt, iron, nickel, copper, manganese, tantalum and the like or alloys containing one or more of these metals. The abrasive particle will constitute 50 or more volume percent of the compact and will in general be diamond or cubic boron nitride.

The diamond for use in compacts may be either natural or synthetic. In the case of synthetic diamonds, the diamond may be made by the method and apparatus described in U.S. Pat. No. 2,947,609.

In the case of cubic boron nitride, such particles may be made by the method and apparatus described in U.S. Pat. No. 2,947,617.

According to the invention there is provided an abrasive compact comprising an effective quantity of abrasive particle selected from cubic boron nitride, diamond and mixtures thereof bonded together by a matrix comprising a refractory substance and a solvent substance which is capable of dissolving the abrasive particle to at least a limited extent. The matrix may also contain a hard material resulting from the interaction of the refractory substance with the solvent substance during compact manufacture.

Further according to the invention, there is provided a method of making an abrasive compact including the step of subjecting a mixture containing effective quantities of abrasive particle selected from diamond, cubic boron nitride and mixtures thereof, a powdered refractory substance and a powdered solvent substance capable of dissolving the abrasive particle to at least a limited extent to conditions of temperature and pressure at which the abrasive particle is crystallographically stable and the solvent substance acts to dissolve the abrasive particle to at least a limited extent. The solvent substance may also have the property of reacting with the refractory substance to form a hard material during compact manufacture. Such interaction is particularly desirable when the solvent substance is a low melting metal or alloy.

The refractory substance may be a boride, nitride or silicide refractory substance. A particularly suitable refractory substance is silicon nitride, particularly silicon nitride in the α-form. The refractory substance may also be magnesium oxide, spinel or alumina either alone or in combination with a nitride, silicide or boride refractory substance.

The refractory substance may also be:
a. silicon nitride powder mixed with silicon, boron and boron carbide, all in powdered form;
b. silicon nitride powder mixed with magnesium oxide powder;
c. silicon nitride powder mixed with alumina and/or magnesium oxide, both of which are in powdered form;
d. silicon nitride powder mixed with powdered spinel;
e. a substance (in crushed form) resulting from the heat treatment of silicon nitride with alumina and magnesium oxide; or
f. a substance (in powdered form) resulting from the heat treatment of silicon nitride with spinel.

The solvent substance must be such as to be capable of dissolving the abrasive particle to at least a limited extent. When a mixture of diamond and cubic boron nitride is used, a mixture of solvent substances will also be used. Such substances are well known in the art and examples thereof can be found in the above-mentioned U.S. patent which are incorporated herein by reference. In the case of cubic boron nitride, particularly preferred solvent substances are aluminium, lead, tin, magnesium and lithium and alloys containing one or more of these metals. As is stated above, the solvent substance may also have the property of being able to react with the refractory substance to form a hard material under the conditions of compact manufacture.

The actual amount of each ingredient of the mixture will vary according to the ingredients and the skilled man can select quantities to suit the need. In general, however, the abrasive particle will be present in the mixture in an amount of at least 70 volume percent, and preferably from 80 to 90 volume percent. The ratio of the solvent substance to refractory substance will in general be in the range of 1/3:2/3 to 2/3:1/3 on a weight basis.

The various ingredients for the mixture are preferably in finely powdered form. Preferably, the average particle size of the ingredients is less than 40 microns and more preferably below about 12 microns. The finer the powder the more compact and tough the final product.

In order to produce the compact, the mixture is subjected to conditions of temperature and pressure at which the abrasive particle is crystallographically stable and the solvent substance acts as a solvent. Such conditions are well known in the art. The attached drawing illustrates the diamond and cubic boron nitride stable regions on a pressure/temperature graph. The diamond stable region is represented above the line A, whereas the cubic boron nitride stable region is represented above the line B. The solvent substance will, in general, act as a solvent when it is molten. The pressures used will usually be in the range 40 to 65 kilobars and the temperatures used will usually be in the range 1200° C to 1600° C.

The invention finds particular application in compacts which contain cubic boron nitride as abrasive particle. The solvent substances for cubic boron nitride, e.g. aluminium, are generally low melting with a result that smearing of the metal on the workpiece can occur during use of the compact. Reacting the solvent substance with the refractory to form a hard material substantially reduces the tendency for this smearing during use to occur.

The starting mixtures for the compact manufacture may, if desired, contain small quantities of graphite or hexagonal boron nitride.

In an example of the invention, a powdered mixture of 8 micron powdered silicon nitride (α - form), commercially available aluminium powder and 2 – 6 micron cubic boron nitride powder was cold compacted and placed in a tantalum casing. The mixture consisted of 80.5 volume percent cubic boron nitride, the balance of the mixture being made up of 68 weight percent silicon nitride and 32 weight percent aluminium. The casing was placed in the reaction zone of a conventional high temperature/pressure apparatus of the type described in U.S. Pat. No. 2,947,609. The pressure of the reaction zone was raised to 55 kilobars and the temperature was raised to 1300°C. Compact formation resulted and after release of the temperature and pressure the compact was recovered in the conventional manner.

The abrasive properties of the recovered compact were compared with a commercially available P 10 tungsten carbide compact and with a compact consisting of about 90 volume percent cubic boron nitride in a 10 volume percent cobalt/aluminium matrix made according to techniques of the prior art. The compacts were incorporated in single point tools and their abrasive properties tested in the turning of mild steel. It was found that the compact of the invention showed 100 times less wear than the tungsten carbide compact and 4 times less wear than the cubic boron nitride/cobalt-aluminium compact.

Moreover, no smearing of the aluminium on the workpiece was observed with the compact of the invention which is attributable to the fact that the silicon nitride reacted with the aluminium to form a hard material. It is believed that the strength of the compact of the invention is also attributable, at least in part, to the fact that there was a certain amount of intergrowth between the cubic boron nitride particles.

The compact of the invention may be suitably secured to a shank. The securing may be achieved by brazing or hot pressing the compact on to the shank using high temperature and pressure conditions and a suitable metal such as cobalt as a brazing medium. The shank may, for example, be made of steel or tungsten carbide. In the case of hot pressing diamond compacts to a shank, it has been found that good results are achieved by hot pressing under conditions which are above line A using cobalt as a bonding medium.

I claim:

1. A method of making an abrasive compact, comprising the steps of forming a mixture of particles of cubic boron nitride, powdered refractory substance selected from the group consisting of silicon nitride, magnesium oxide, spinel and alumina, and a powdered solvent for cubic boron nitride selected from the group consisting of aluminum, lead, tin, magnesium, lithium and an alloy thereof, and subjecting said mixture to elevated temperature and pressure at which cubic boron nitride is crystallographically stable and said solvent partially dissolves said cubic boron nitride to at least a limited extent.

2. A method as claimed in claim 1, in which said mixture contains at least 70 volume percent cubic boron nitride particles, said refractory substance is silicon nitride and said solvent is aluminum.

3. A method according to claim 1 wherein the cubic boron nitride is present in an amount of at least 70 volume percent.

4. A method according to claim 1 wherein the cubic boron nitride is present in an amount from 80 to 90 volume percent.

5. A method according to claim 1 wherein the ratio of solvent to refractory substance is in the range of from 1/3:2/3 to 2/3:1/3 on a weight basis.

6. A method according to claim 1 wherein the refractory substance is silicon nitride.

7. A method according to claim 6 wherein the silicon nitride is in the $\alpha$-form.

8. A method according to claim 1 wherein the solvent is aluminium.

9. A method according to claim 2 wherein the silicon nitride is in the $\alpha$-form.

10. A method according to claim 1 wherein the mixture is subject to a pressure in the range of 40 to 65 kilobars and a temperature of 1200°C to 1600°C.

11. A compact produced by the process of claim 1.

* * * * *